US012108055B2

United States Patent
Amirpour et al.

(10) Patent No.: US 12,108,055 B2
(45) Date of Patent: Oct. 1, 2024

(54) SCALABLE PER-TITLE ENCODING

(71) Applicant: BITMOVIN, INC., San Francisco, CA (US)

(72) Inventors: Hadi Amirpour, Klagenfurt am Wörthersee (AT); Christian Timmerer, Klagenfurt am Wörthersee (AT)

(73) Assignee: BITMOVIN, INC., San Francisco, CA (US)

( * ) Notice: Subject to any disclaimer, the term of this patent is extended or adjusted under 35 U.S.C. 154(b) by 70 days.

(21) Appl. No.: 17/965,124

(22) Filed: Oct. 13, 2022

(65) Prior Publication Data
US 2023/0118010 A1    Apr. 20, 2023

Related U.S. Application Data

(60) Provisional application No. 63/256,508, filed on Oct. 15, 2021.

(51) Int. Cl.
*H04N 19/179* (2014.01)
*H04N 19/29* (2014.01)

(52) U.S. Cl.
CPC .......... *H04N 19/179* (2014.11); *H04N 19/29* (2014.11)

(58) Field of Classification Search
CPC .... H04N 19/179; H04N 19/29; H04N 19/174; H04N 19/30
See application file for complete search history.

(56) References Cited

U.S. PATENT DOCUMENTS

| | | | |
|---|---|---|---|
| 2021/0211684 A1* | 7/2021 | Andreopoulos | G06N 3/088 |
| 2023/0088688 A1* | 3/2023 | Grois | H04N 21/2662 |
| | | | 709/231 |

OTHER PUBLICATIONS

V.V Menon et al., "Efficient Content-Adaptive Feature-Based Shot Detection for HTTP Adaptive Streaming" IEEE, May 20, 2021, pp. 1-2, https://www.youtube.com/watch?v=jkA1R0shpTc.
Liu et al., "Video Super-Resolution Based on Deep Learning: A Comprehensive Survey", arXiv:2007.12928v3 [cs.CV], Mar. 16, 2022, pp. 1-33.
Lederer et al., "Dynamic Adaptive Streaming over HTTP Dataset", Proceedings of the 3rd Multimedia Systems Conference, Feb. 2012, pp. 89-94.
Jon Dahl, "Instant Per-Title Encoding", MUX, Apr. 17, 2018, pp. 1-8, https://mux.com/blog/instant-per-title-encoding/.
(Continued)

*Primary Examiner* — Richard T Torrente
(74) *Attorney, Agent, or Firm* — Marton Ribera Schumann & Chang LLP; Chien-Ju Alice Chuang; Hector J. Ribera

(57) ABSTRACT

A scalable per-title encoding technique may include detecting scene cuts in an input video received by an encoding network or system, generating segments of the input video, performing per-title encoding of a segment of the input video, training a deep neural network (DNN) for each representation of the segment, thereby generating a trained DNN, compressing the trained DNN, thereby generating a compressed trained DNN, and generating an enhanced bitrate ladder including metadata comprising the compressed trained DNN. In some embodiments, the method also may include generating a base layer bitrate ladder for CPU devices, and providing the enhanced bitrate ladder for GPU-available devices.

13 Claims, 10 Drawing Sheets

(56) References Cited

OTHER PUBLICATIONS

Ledig et al., "Photo-Realistic Single Image Super-Resolution Using a Generative Adversarial Network", arXiv:1609.04802, May 25, 2017, pp. 1-19, http://arxiv.org/abs/1609.04802.
Mishra et al., "A Survey on Deep Neural Network Compression: Challenges, Overview, and Solutions", arXiv:2010.03954, Oct. 5, 2020, pp. 1-19, https://arxiv.org/abs/2010.03954.
Li et al., "Toward A Practical Perceptual Video Quality Metric", Netflix Technology Blog, Jun. 5, 2016, pp. 1-23, https://netflixtechblog.com/toward-a-practical-perceptual-video-quality-metric-653f208b9652.

\* cited by examiner

SCALABLE PER-TITLE ENCODING

CROSS-REFERENCE TO RELATED APPLICATIONS

This application claims priority to U.S. Provisional Patent Application No. 63/256,508 entitled "Scalable Per-Title Encoding," filed Oct. 15, 2021, the contents of which are hereby incorporated by reference in their entirety.

BACKGROUND OF INVENTION

The current state of video streaming presents the following technological problem: the optimization of bitrate ladders for particular types of end-user devices based on their onboard processors (be it CPU-only and GPU-available) will compromise the quality for the other type processor. In other words, if the bitrate ladder is optimized for CPU-only devices, the video when content is played back on devices which have GPU processors available will suffer.

In HTTP Adaptive Streaming (HAS), each video is segmented into smaller chunks, and each chunk is encoded at multiple pre-defined bitrates to construct a bitrate ladder. To optimize bitrate ladders, per-title encoding approaches encode each chunk at various bitrates and resolutions to determine the convex-hull. From the convex-hull, an optimized bitrate ladder is constructed, resulting in an increased Quality of Experience (QoE) for the end-users. With the ever-increasing efficiency of deep learning-based video enhancement approaches, they are employed more and more at the client-side to increase the QoE. Furthermore, while content-aware video super-resolution approach leads to a higher video quality, the cost is a bitrate overhead.

Conventionally, a single bitrate ladder, is used for all video contents. To cope with the increasing popularity of the Video on Demand (VoD) services, video content providers try to optimize the bitrate ladder per title to increase the Quality of Experience (QoE). When a single or "one-size-fits-all" bitrate ladder is used for all video contents, "easy to encode" videos will suffer from over-allocating bitrate, while under-allocating bitrate for "hard to encode" videos results in a low-quality video and a lower QoE. Therefore, different video contents require content-fit bitrate ladders to reach a certain perceived video quality.

For a video sequence that is an "easy to encode" video and perceptually lossless at higher bitrates (e.g., greater than 45 dB PSNR), selecting a high bitrate by using a fixed bitrate ladder will result in bitrate wastage. On the other hand, for a video sequence that is a "hard to encode" video, a high bitrate is preferable to reach an acceptable quality.

In addition to the bitrate or quality level, bitrate ladders are optimized over spatial resolution. The usual trend is that lower resolutions outperform higher resolutions at lower bitrates and as the bitrate increases the optimal resolution is switched to a higher resolution. The lower resolution version of each video content is affected by compression and upsampling artifacts, while the highest resolution version is only affected by compression artifacts. Low-resolution videos are upscaled because we assume that all videos are watched at a display with the same resolution of the original video source.

At lower bitrates, the lower resolution versions have better quality than the highest resolution version due to the fewer number of pixels per frame, which results in a higher quality video than the highest resolution version encoded at the same bitrate, even when upsampling is applied. However, as the bitrate increases, the higher resolution video will outperform the lower resolution video in terms of quality. Videos exhibit content-dependent behavior for which a bitrate ladder should be optimized over spatial resolution per title. This has led to optimizing the bitrate ladder per video content and per-title encoding.

For each video content, the bitrate ladder is typically improved over (i) bitrate and/or (ii) resolution. A conventional example encodes each video segment at a number of quality levels and bitrate resolution pairs per each quality level. The resolutions and bitrates are limited to a finite set. The encodings parameters are set based on the following criteria: (i) The selected bitrate resolution pair should be of the highest possible quality; (ii) There should be a perceptual gap between adjacent selected bitrates. Another attempted method has been to generate a DASH video encoded at five different resolutions, namely 240p, 480p, 720p, 1080p, and 2160p, maintaining the requested quality metric at each resolution.

Another known context-aware bitrate ladder considers the characteristics of the video source, as well as the characteristics of the networks. Yet another utilizes a multi-period per-scene optimization procedure that optimizes the bitrate ladder for (i) maximum possible quality or (ii) minimum possible bitrate.

Considering r resolutions, and b bitrates, finding the per-title bitrate ladder typically requires r×b trials to be encoded. To avoid a brute force encoding of all bitrate-resolution pairs, some methods pre-analyze the video content. A known content-gnostic method utilizes machine learning to find the bitrate range for each resolution that outperforms other resolutions. This approach involves significantly fewer test pre-encodes compared to the brute force approach while reaching a 0.51 BD-Rate loss.

Video super-resolution (VSR) refers to enhancing video's resolution from a low value to a higher value. VSR algorithms are mainly classified into two categories: (i) traditional and (ii) deep learning-based. Traditional VSR methods are mainly based on an Affine model or a Bayesian model. Deep learning-based VSR algorithms show significant improvements over traditional approaches.

Deep learning-based VSR algorithms are mainly based on convolutional neural networks (CNN), generative adversarial networks (GAN), and recurrent neural networks (RNN). Generally, the framework for deep learning-based VSR algorithms includes one alignment module, one feature extraction and fusion module, and one reconstruction module. Well-known image/video super-resolution approaches include FSRCNN, SRGAN, CARN, EDVR, and RBPN. The encoding efficiency of 270p is improved using EDVR VSR method. The improved low-resolution videos will change the crossover bitrates between different resolutions and improve the final convex-hull. FIG. 2 is chart illustrating rate distortion curves for a video sequence encoded at 270p and upscaled by prior art bicubic and EDVR methods. As the bitrate (i.e., quality) of the bitstream increases, the EDVR method becomes more efficient due to a reduced compression artifact. The improved low-resolution videos will change the cross-over bitrates between different resolutions and improve the final convex-hull. In FIG. 2, EDVR changes the cross-over bitrate between 1080p and 270p upscaled by bicubic and EDVR for an example sequence. Using the bicubic method, cross-over happens at approximately 320 kbps. Using EDVR, cross-over happens at approximately 1220 kbps. Although deep learning-based VSR approaches generally are efficient in improving quality of downloaded representations at the client, FIG. 3 shows VSR-based convex-hull is improved compared to bicubic-based convex-hull; however, this results in suboptimal performance for CPU-only end users.

Thus, improved scalable approaches are desirable to support end-user devices with both CPU and GPU capabilities.

BRIEF SUMMARY

The present disclosure provides techniques for scalable per-title encoding. A method for scalable per-title encoding may include: receiving an input video; detecting scene cuts in the input video; generating a plurality of segments of the input video; performing per-title encoding of a segment of the plurality of segments of the input video; training a deep neural network (DNN) for each representation of the segment, resulting in a trained DNN; compressing the trained DNN, resulting in a compressed trained DNN; and generating an enhanced bitrate ladder including metadata comprising the compressed trained DNN. In some examples, the generating the plurality of segments of the input video includes indicating a first scene segment. In some examples, the method also may include determining whether the segment comprises a first scene segment. In some examples, the training the DNN comprises a first number of epochs when the segment comprises the first scene segment and a second number of epochs when the segment does not comprise the first scene segment. In some examples, the second number of epochs is less than the first number of epochs. In some examples, the training the DNN for the second number of epochs uses a weight from a previously-trained DNN for an other segment from the same scene as the segment. In some examples, the other segment is the first scene segment. In some examples, generating the plurality of segments comprises concatenating a plurality of scenes, resulting in a concatenated video. In some examples, generating the plurality of segments further comprises dividing the concatenated video into the plurality of segments. In some examples, detecting scene cuts comprises implementing an efficient content-adaptive feature-based shot detection algorithm. In some examples, the DNN comprises a content-aware video super-resolution (VSR) DNN.

In some examples, the method also includes using the enhanced bitrate ladder to provide video content to a client device (e.g., a GPU-available device). In some examples, the method also includes generating a base layer bitrate ladder for the plurality of segments. In some examples, the method also includes providing the base layer bitrate ladder to a CPU device.

A non-transitory computer-readable medium storing computer instructions for scalable per-title encoding that when executed on one or more computer processors perform the steps of: receiving an input video; detecting scene cuts in the input video; generating a plurality of segments of the input video; performing per-title encoding of a segment of the plurality of segments of the input video; training a deep neural network (DNN) for each representation of the segment, resulting in a trained DNN; compressing the trained DNN, resulting in a compressed trained DNN; and generating an enhanced bitrate ladder including metadata comprising the compressed trained DNN. In some examples, the computer instructions for scalable per-title encoding when executed further perform the step of: determining whether the segment comprises a first scene segment. In some examples, the computer instructions for scalable per-title encoding when executed further perform the step of: generating a base layer bitrate ladder for the plurality of segments. In some examples, the computer instructions for scalable per-title encoding when executed further perform the step of: storing in a network-accessible storage one, or a combination of, the enhanced bitrate ladder, the plurality of segments, the trained DNN, the compressed trained DNN.

Figure 1:
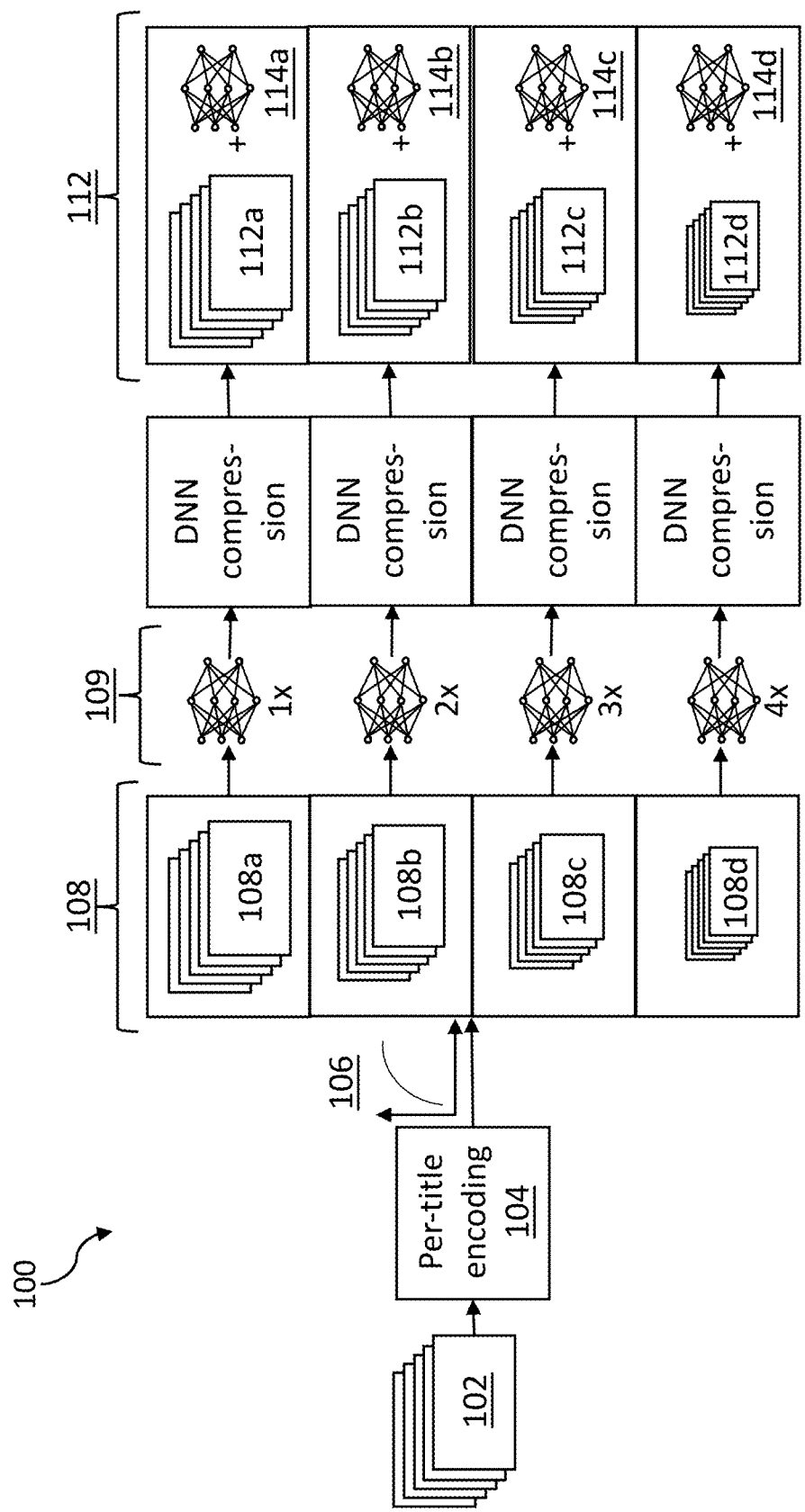
FIG. 1 is a flow diagram illustrating the flow of video data through a scalable per-title encoding system, in accordance with one or more embodiments.
Figure 2:
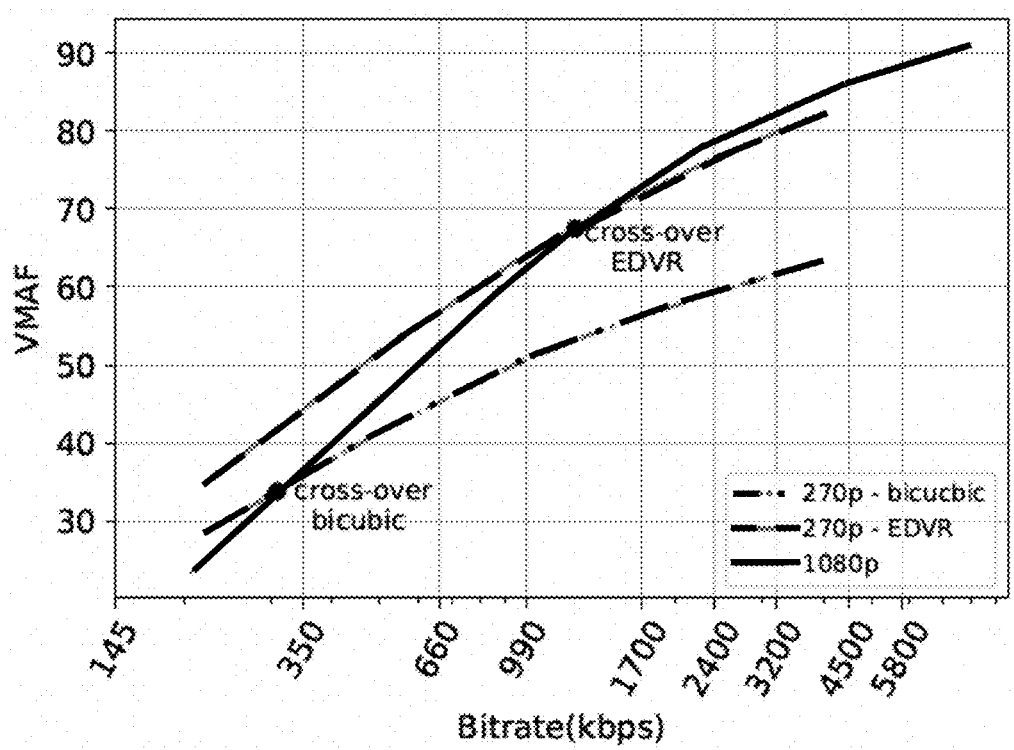
FIG. 2 is chart illustrating rate distortion curves for a video sequence encoded at 270p and upscaled by prior art bicubic and EDVR methods.

The figures depict various example embodiments of the present disclosure for purposes of illustration only. One of ordinary skill in the art will readily recognize from the following discussion that other example embodiments based on alternative structures and methods may be implemented without departing from the principles of this disclosure, and which are encompassed within the scope of this disclosure.

DETAILED DESCRIPTION

The Figures and the following description describe certain embodiments by way of illustration only. One of ordinary skill in the art will readily recognize from the following description that alternative embodiments of the structures and methods illustrated herein may be employed without departing from the principles described herein. Reference will now be made in detail to several embodiments, examples of which are illustrated in the accompanying figures.

The above and other needs are met by the disclosed methods, a non-transitory computer-readable storage medium storing executable code, and systems for leveraging online audio for sales engagement.

The invention improves bitrate ladders over a new dimension, i.e., upscaling methods, considering both CPU-only and GPU-available users. With the ever-increasing efficiency of Video Super-Resolution (VSR) approaches, in particular, deep learning-based approaches, the improved upscaled encodings may improve the bitrate ladder. However, deep learning-based VSR approaches require high-end devices such as GPU to perform in real-time. Therefore, optimizing bitrates over upscaling methods may result in suboptimal video delivery for the end-users without a proper device (CPU-only and other legacy device users).

The invention described herein is related to a scalable content-aware per-title encoding ("SPTE") approach for adaptive streaming to support both CPU-only and GPU-available users. In some examples, GPU-available client devices may be configured to perform learned visual enhancement approaches in real-time. Aspects of the invention include (i) to support backward compatibility (e.g., provide an appropriate bitrate ladder for CPU-only client devices), SPTE may construct a bitrate ladder based on an existing per-title encoding approach (e.g., such that the video content will be provided for legacy end-user devices with CPU-only capabilities as a base layer (BL)); (ii) for high-end end-user devices with GPU capabilities, an enhancement layer (EL) (e.g., a content-aware video super-resolution network) may be added on top of the BL comprising light-weight content-aware video super-resolution (VSR) deep neural networks (DNNs) for each representation of the bitrate ladder, a super-resolution network (e.g., VSR DNN) being trained and used as metadata for the corresponding representation, providing higher video quality and improved robustness of the super-resolution network for various content; (iii) a DNN compression method (e.g., DeepCABAC, network pruning, sparse representation, bits precision, knowledge distillation, and other DNN compression techniques, and other DNN compression techniques) to reduce the required bitstream for delivery of the associated DNN (e.g., metadata); and (iv) scene-cut detection algorithms to reduce the additional cost to train DNNs—similarity of segments within a scene and similarity of frames within a segment may be used to reduce additional cost required to train a DNN per representation.

To reduce the bitrate overhead for streaming content-aware video super-resolution DNN, a context-adaptive binary arithmetic coding for DNN compression (e.g., DeepCABAC) may be used. DeepCABAC is known to reach up to 63× compression ratio of a DNN with no accuracy loss. Experimental results show about 40% bitrate reduction for GPU-available end-users, while provides the video content for CPU-only users as per usual.

FIG. 1 shows an overview of the proposed method, illustrating the flow of video data through a scalable per-title encoding system. Diagram 100 includes video input 102, per-title encoding module 104, convex hull 106, bitrate ladder 108 including a representation for each bitrate (e.g., representations 108a-108d), enhanced bitrate ladder 112 including a representation with compressed enhancement layer for each bitrate (e.g., representations 112a-112d and compressed DNNs 114a-114d, respectively). As described herein, SPTE may include constructing bitrate ladder 108 as a base layer, training an enhancement layer 109 to generate an associated DNN for each representation, using DNN compression to reduce the bitstream for delivery of the associated DNN(s). In some examples, a scene-cut detection algorithm may be used to reduce the number of DNNs trained. This process results in an enhanced bitrate ladder 112 for user devices with GPU-capabilities.

In an example of per-title encoding, the encodings may be selected between two quality levels: (i) an upper quality where there is no visible quality improvement beyond that; (ii) a lower quality where encoding artifacts become visibly lower than that. N encodings are selected between these two quality levels to form the bitrate ladder. In an example PSTR, in addition to the bitrate and spatial resolution, the frame rate as temporal resolution, is added as a new dimension to improve the bitrate ladder. Each video segment may be encoded at multiple spatial and temporal resolutions, and a convex-hull (e.g., convex hull 106) may be determined based on the spatially and/or temporally upscaled encoded representations. In addition to the bitrate, spatial and temporal resolution, upscaling may be added as a new dimension, to further improve bitrate ladders.

Figure 3:
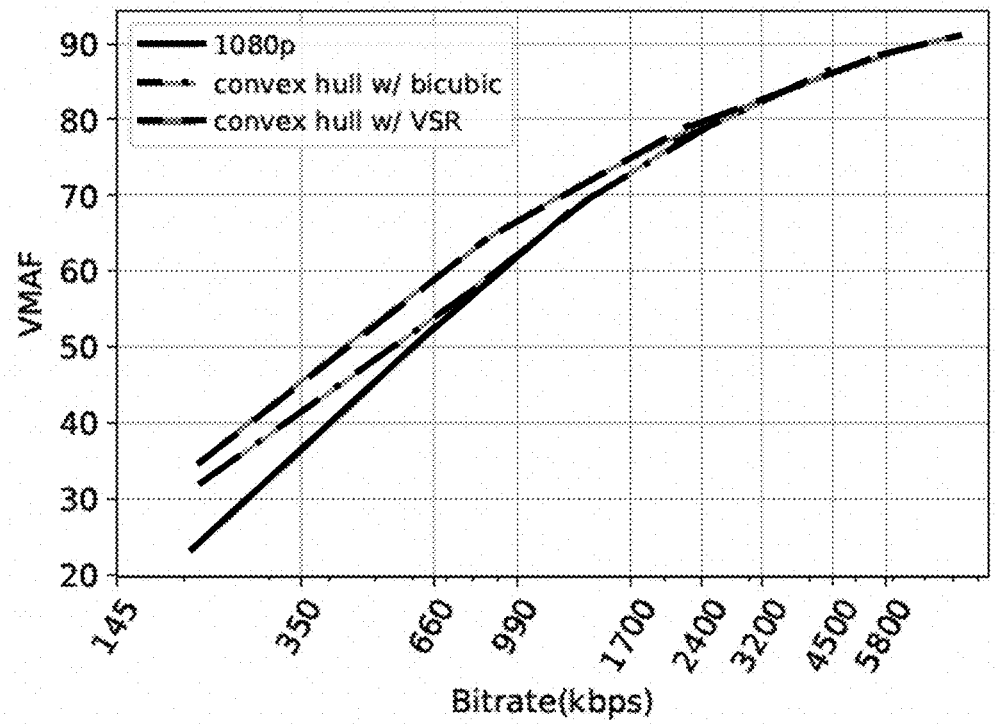
FIG. 3 is a chart illustrating convex hulls formed by prior art bicubic and EDVR upscaling methods.

Considering two different upscaling methods, i.e., conventional bicubic and deep learning-based VSR, two different convex-hulls will be formed per each upscaling method. FIG. 3 shows RD curves for two convex-hulls formed by a conventional bicubic and a deep learning-based VSR algorithm (e.g., EDVR) in addition to the RD curve for encoding the segment at 1080p. The VSR-based convex-hull is improved compared to the conventional bicubic-based convex-hull. However, constructing a bitrate ladder based on this convex-hull will result in suboptimal performance for CPU-only end users, and constructing a bitrate ladder based on bicubic-based convex-hull will result in suboptimal performance for GPU-available end users. Constructing bitrate ladder based on each upscaling method results in a suboptimal performance for the other upscaling method. Instead, a scalable per-title encoding (i.e., SPTE) method, as described herein, constructs a bitrate ladder based on a bicubic-based convex-hull and improves quality for GPY-available end users with deep learning-based VSR algorithms. While VSR algorithms typically are trained using uncompressed images/videos, in SPTE, they may also be used for low-resolution videos affected by compression artifacts.

Figure 4:
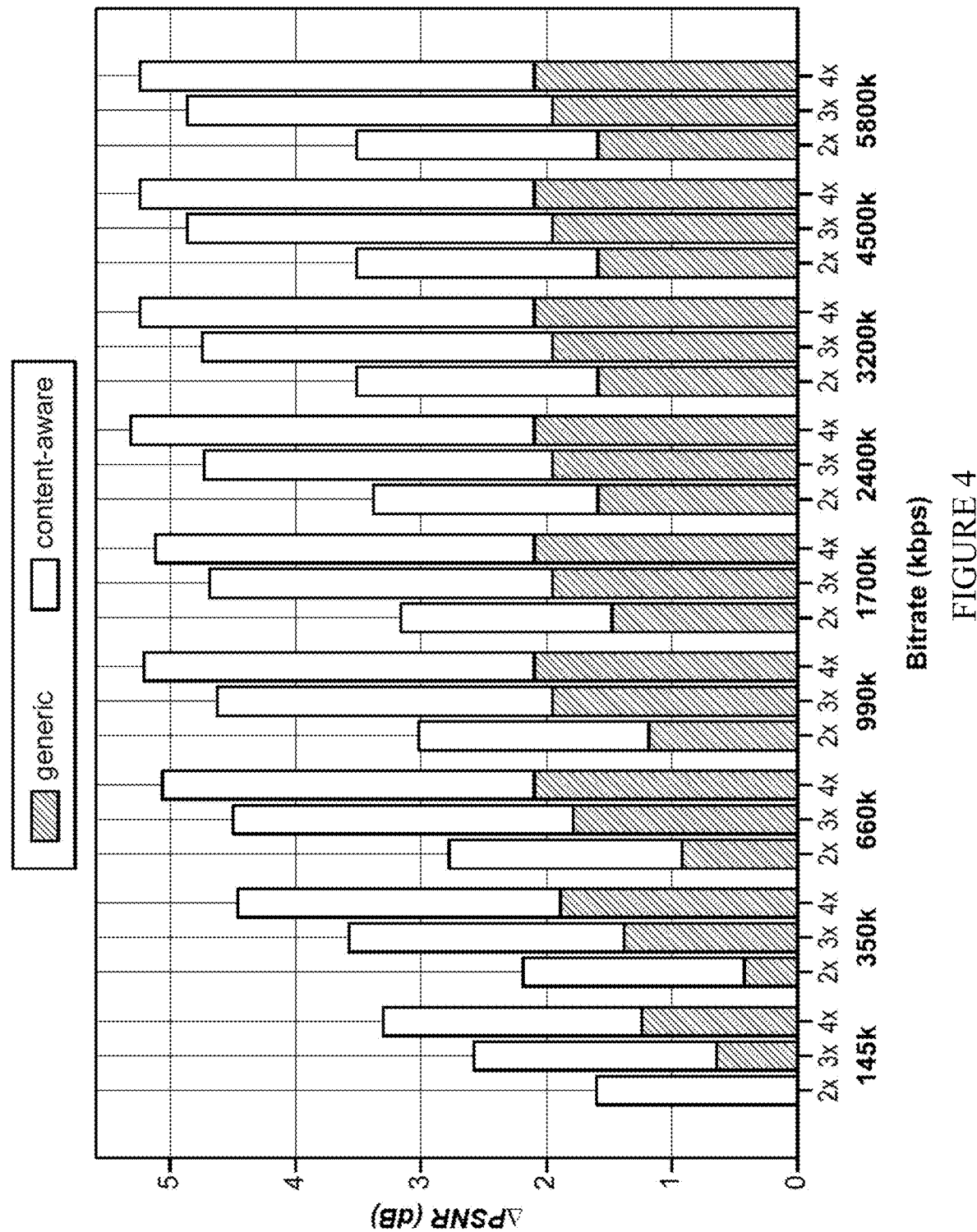
FIG. 4 is a chart illustrating ΔPSNR for generic and content-aware $CARN_m$ DNN with respect to the bicubic approach at different bitrates and upscaling factors, in accordance with one or more embodiments.

Content-aware DNNs improve the reliability of VSR methods by improving the quality of the bitstream. In addition, quality improvement using content-aware VSR approaches is significantly higher than when using generic VSR approaches. In an example, a 1080p sequence from a dataset is encoded at multiple bitrates and resolutions (e.g., 270p, 360p, 540p), and each encoding may be upscaled to 1080p using both generic and content-aware $CARN_m$ VSR DNNs. FIG. 4 illustrates $\Delta$PSNR for both approaches relative to a bicubic approach at multiple bitrates and upscaling factors. As shown, the content-aware $CARN_m$ yields a higher quality improvement compared to the generic $CARN_m$. Furthermore, content-aware VSR DNNs may be bitrate-dependent, such that they will perform differently for content encoded at different bitrates.

Figure 5:
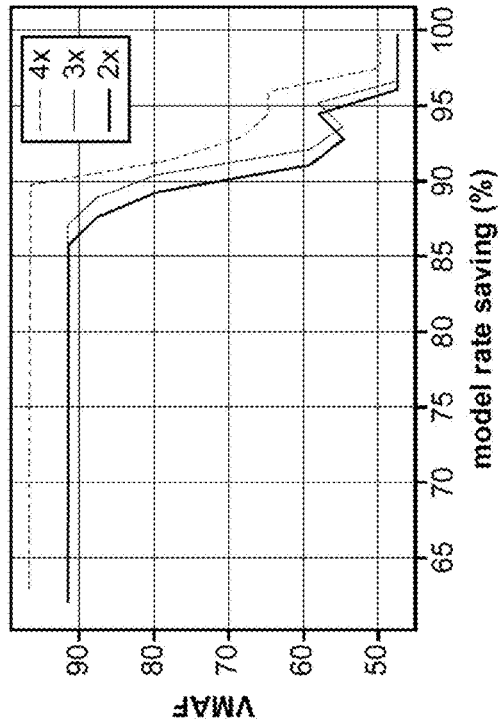
FIG. 5 is a pair of charts illustrating PSNR and VMAF of upscaled videos with compressed DNNs at different model rate savings, in accordance with one or more embodiments.
Figure 5:
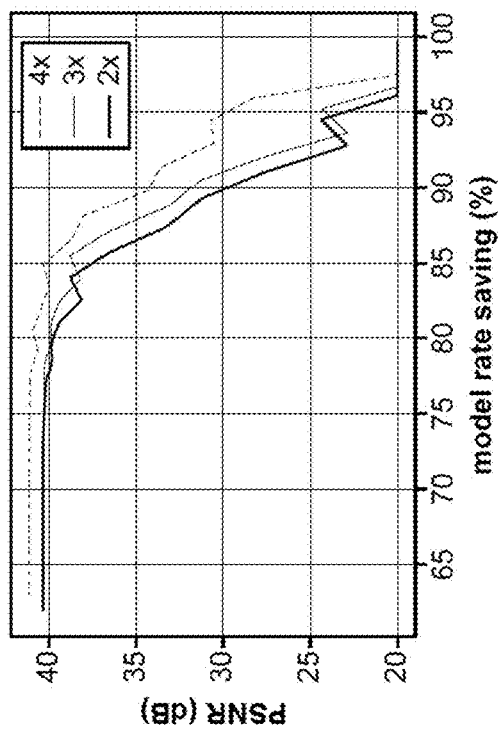

In some examples, an SPTE system may use content-aware DNNs as metadata for each representation in a bitrate ladder and may deliver it to an end user device that supports real-time VSR. Light-weight VSR DNNs have small-size networks and perform real-time on generic GPUs. To reduce the overhead bitrate required to stream VSR DNNs, neural network compression methods may be employed. DNN compression methods may utilize different techniques, including (i) network pruning, (ii) sparse representation, (iii) bits precision, (iv) knowledge distillation, and (v) miscellaneous to compress DNNs with minimal accuracy compromise. For example, DeepCABAC is a context-adaptive binary arithmetic coding for DNN compression that can reach up to 63× compression ratio of a DNN with no accuracy loss. To evaluate the impact of DNN compression on the accuracy, a sequence may be encoded at 350 kbps at three resolutions (e.g., 270p, 360p, and 540p, and other sets of resolutions) and upscale them with compressed DNNs. FIG. 5 shows (a) PSNR and (b) VMAF of upscaled videos with compressed DNNs at different model rate savings, respectively:

$$\text{model rate saving} = 1 - \frac{\text{size compressed } DNN}{\text{size uncompressed } DNN}$$

As shown in FIG. 5, approximately 80% of DNN size can be reduced using DNN compression (e.g., DeepCABAC), while maintaining the same accuracy as a corresponding uncompressed DNN.

Although allocating a DNN for each representation in a bitrate ladder can improve the quality of each representation significantly, it may add additional costs for content providers to train DNNs per each representation. To reduce this cost, different approaches can be used, including using pre-trained models, frame subsampling, and scene-cut detection.

Figure 6A:
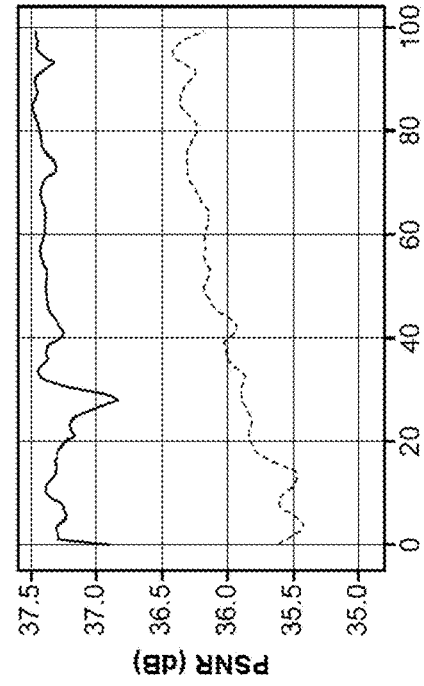
FIG. 6A is a chart illustrating training loss with and without using a pre-trained model on the one hand.

In some examples, using DNN weights of a previously trained model to start the training of a DNN can reduce the training cost compared to starting with random weights. In an example, an FSRCNN may be trained for a 270p video encoded at 145 kbps with and without using weights of a pre-trained model. FIG. 6A is a chart illustrating training loss with and without using a pre-trained model on the one hand. As shown, utilizing a pre-trained model to train a new content can result in a lower training loss at a certain number of epochs.

Figure 6B:
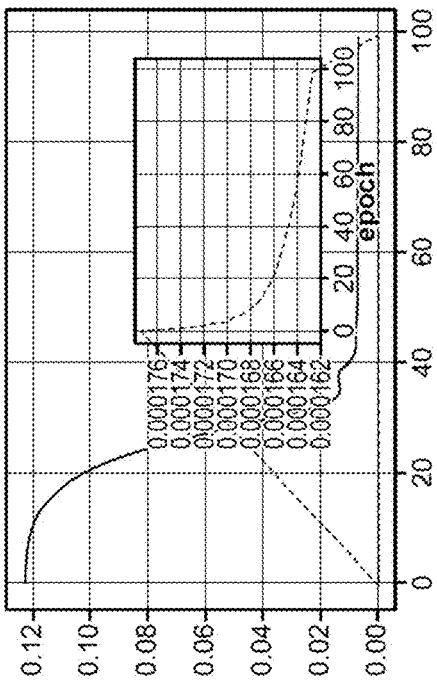
FIG. 6B is a chart illustrating PSNR values when upscaling a low resolution video with DNNs pre-trained starting with weights of a generic DNN versus weights of a DNN pre-trained with a previous segment's DNN's weights.

A segment within a scene is more likely to be similar to other segments in the same scene than segments in other scenes. Thus, a DNN may be trained to super resolve a video segment (e.g., 4 seconds each or more or less) using weights of the pre-trained generic DNN and weights of the pre-trained DNN for the previous segments. FIG. 6B is a chart illustrating PSNR values when upscaling a low resolution video with DNNs pre-trained starting with weights of a generic DNN versus weights of a DNN pre-trained with a previous segment's DNN's weights. FIG. 6B shows that the quality of training with the pre-trained DNN for previous segments is higher than training with the pre-trained generic DNN. The number of epochs for segments within a scene may be reduced. If a network is trained e1 (i.e., a given number of) epochs for a first segment of a scene (i.e., a first scene segment), networks for other segments in that scene can be trained e2 (i.e., a smaller number of) epochs (e.g., using weights of a pre-trained DNN for another segment, such as a first scene segment, from the same scene), wherein e2<e1. For a first scene segment, DNN weights of a generic DNN may be used to start the training. For all other segments, DNN of $(N+1)^{th}$ segment may be trained using weights of $N^{th}$ segment's DNN as initial weights. In an example, e1 may be set to 100 epochs for training a first scene segment and e2 may be set to 10 for training other segments of the same scene.

Also frames within a segment are usually very similar; therefore, subsampling frames also will reduce training cost by a factor of x if 1/x of frames are selected for training. In an x example, a 4s, 270p, 30 fps segment encoded at 145 kbps is trained using 1, 2, 6, 60, and 120 frames for 50 epochs, and the trained networks may be used to super resolve all 120 frames. PSNRs are obtained, 37.24, 37.26, 37.19, 37.23, 37.22, and 37.27, respectively. Selecting few frames to train the DNN will have the same results as selecting all frames, but at a much lower cost.

Figure 7:
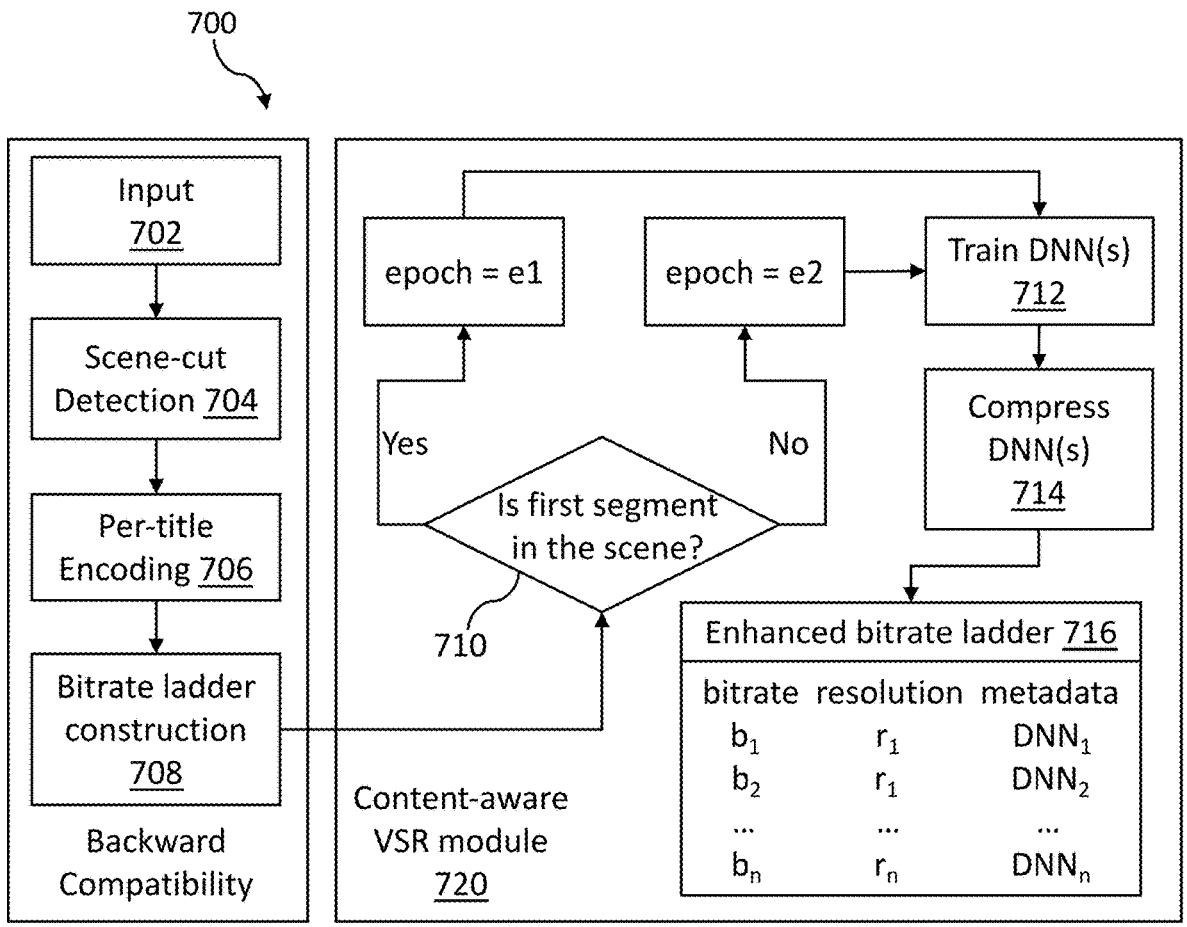
FIG. 7 is a flow chart illustrating an exemplary scalable per-title encoding method, in accordance with one or more embodiments.

FIG. 7 is a flow chart illustrating an exemplary scalable per-title encoding method, in accordance with one or more embodiments. Method 700 includes scene-cut detection, per-title encoding, training a DNN, and compressing the DNN, as described herein. Method 700 shows a content-aware VSR approach wherein a VSR DNN is trained for each representation. For backward compatibility (e.g., benefit of CPU-only end users), an input (e.g., video content) may be received at step 702, and scene-cut detection performed at step 704. Segments within a scene often have a high similarity. Similarity among segments within a scene may be used to reduce training costs by using a scene-cut detection algorithm to detect scene boundaries. In some examples, scene-cut detection may include performing an efficient content-adaptive feature-based shot detection algorithm. In an example, an efficient content-adaptive feature-based shot detection algorithm may include calculating temporal changes within frames based on a sum of absolute differences (SAD) of a weighted Discrete Cosine Transform (DCT) energy feature computed per frame, and subsequently using a successive elimination algorithm (SEA) to determine an instantaneous decoder refresh (IDR) frames within the video sequence based on the gradient of the temporal complexity feature. In some examples, video input (e.g., after scene-cut detection) also may be concatenated and divided into segments (e.g., each segment being a given number of seconds in length), as shown in FIG. 8.

Per-title encoding and bitrate ladder construction may be performed at steps 706 and 708, respectively, using any existing per-title encoding approach, thereby providing backward compatible video content for legacy end user devices with CPU-only capabilities. A bitrate ladder constructed at step 708 may then be provided as a base layer to a content-aware VSR module 720, which may determine at step 710 whether the segment comprises a first scene segment (i.e., a first segment in a scene). If yes, then a network may be trained e1 epochs at step 712. If it is not a first segment in the scene, then a network may be trained e2 (i.e., fewer) epochs at step 712. A video enhancement DNN may be trained for each bitrate-resolution pair in the bitrate ladder constructed at step 708. In some examples, content-adaptive DNNs may be more reliable and yield higher performance than generic DNNs. Any video enhancement DNN (e.g., VSR, video frame interpolation, video compression artifact removal DNN, and the like) may be used to improve the quality of the selected bitrate-resolution pairs. In an example, a VSR DNN (e.g., FSRCNN) may include feature extraction, shrinking to reduce feature maps, non-linear mapping, expanding to increase feature map, and deconvolution to reconstruct high resolution image (e.g., using a 9×9 filter). Since VSR DNNs have fewer network parameters compared to other video enhancement methods, they are suitable for streaming applications (e.g., real-time on generic GPUs). Trained DNNs may be compressed at step 714, resulting in compressed trained DNNs (e.g., for each of a set of resolutions). Known DNN compression techniques may be used to reduce overhead bitrate required to stream the trained DNNs (e.g., network pruning, sparse representation, bits precision, knowledge distillation, and other DNN compression techniques). An enhanced bitrate ladder may be constructed at step 716 using the compressed trained DNNs.

Figure 8:
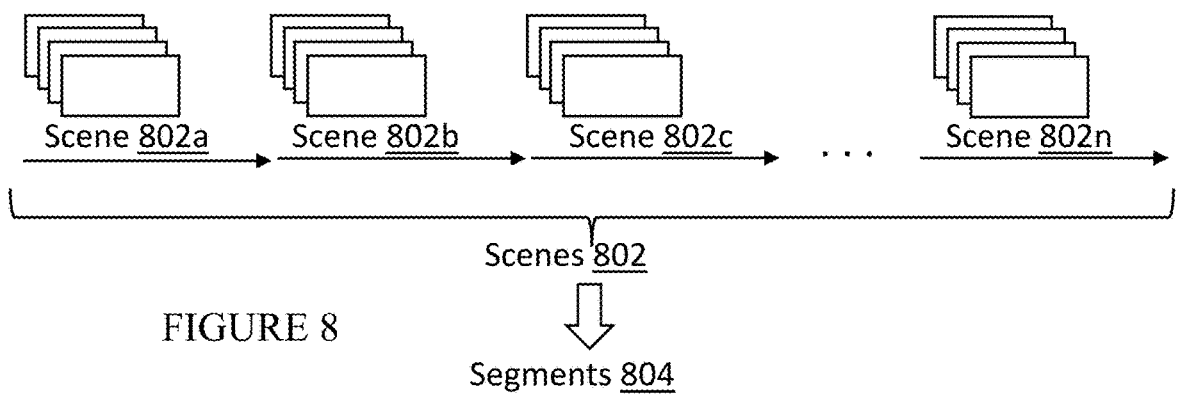
FIG. 8 is a simplified flow diagram illustrating videos being concatenated and segmented, in accordance with one or more embodiments.

FIG. 8 is a simplified flow diagram illustrating videos being concatenated and segmented, in accordance with one or more embodiments. In some examples, a video comprising scenes 802, including scenes 802a through 802n, from a dataset may be concatenated to generate a concatenated (e.g., sequential) video. The concatenated video comprising scenes 802 may be divided into segments 804 of a given length (e.g., 4 seconds long, or longer or shorter). In some examples, an efficient content-adaptive feature-based shot detection algorithm may be used to detect scene cuts. A bitrate ladder may be constructed for segments 804 (e.g., for each of a set of resolutions) using any known methods, including methods described herein. A bitrate ladder may be optimized over a given set of resolutions (e.g., 270p, 360p, 432p, 540p, 720p, and 1080p, among others). For each selected bitrate-resolution pair, a DNN may be trained. In some examples, a light-weight VSR may be used, for example, one that can reach real-time performance on generic GPUs (e.g., FSRCNN—its fewer number of parameters results in a few seconds of training time per each representation).

Figure 9:
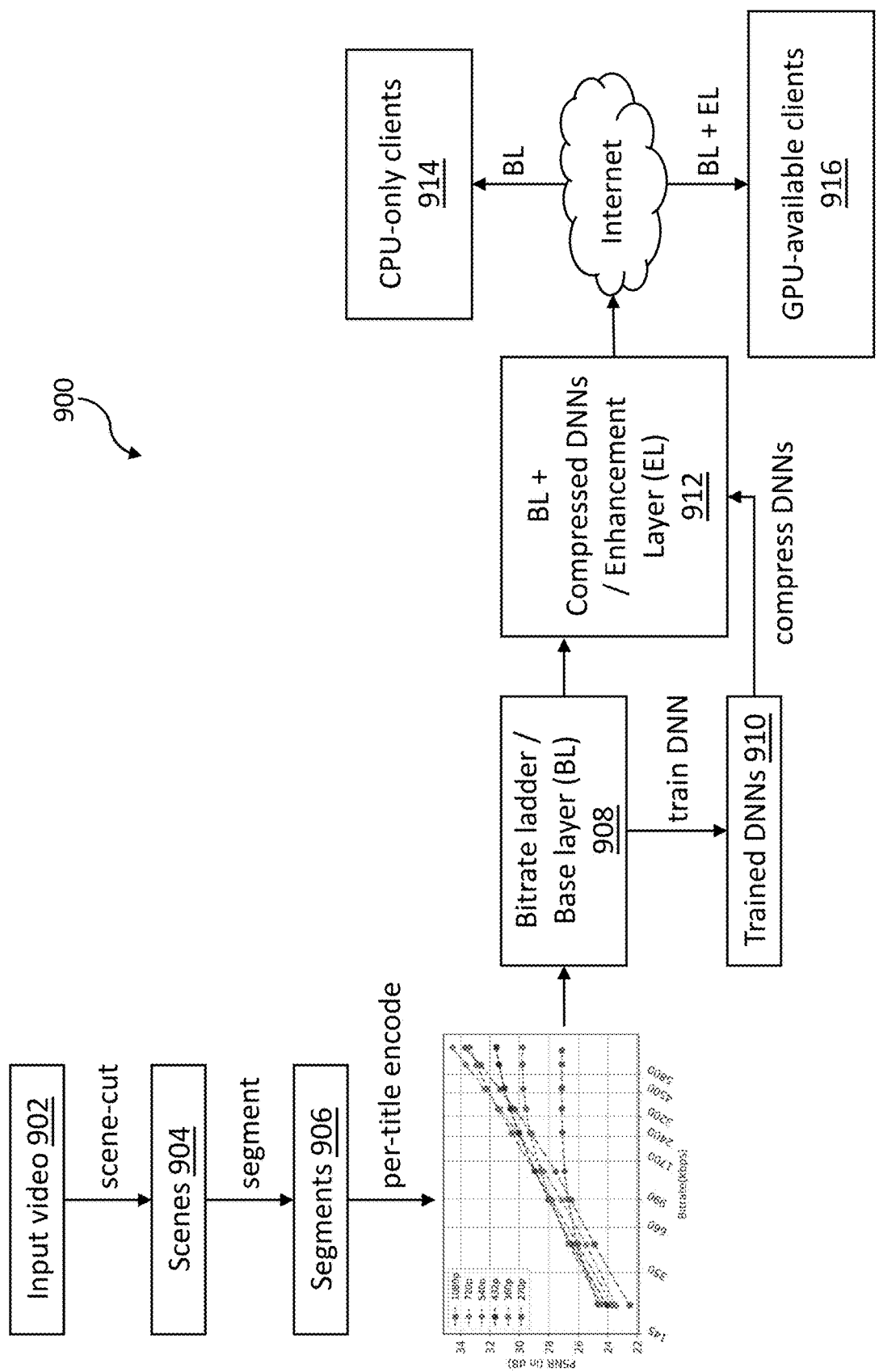
FIG. 9 is a simplified block diagram of an exemplary system architecture for scalable per-title encoding, in accordance with one or more embodiments.

FIG. 9 is a simplified block diagram of an exemplary system architecture for scalable per-title encoding, in accordance with one or more embodiments. Diagram 900 includes input video 902, scenes 904, segments 906, a base layer bitrate ladder (BL) 908, trained DNNs 910, BL plus enhancement layer (EL) (e.g., comprising compressed trained DNNs) 912, CPU-only clients 914, and GPU-available clients 916. In some examples, input video 902 may be partitioned (i.e., divided) into scenes 904 using a scene-cut detection algorithm. The per-scene optimization boosts the quality of video streaming. Each of scenes 904 may be further partitioned into segments 906 (e.g., short intervals) for adaptive bitrate streaming. Per-title encoding may be performed on each of segments 906 to construct a bitrate ladder for each segment (BL 908). Any existing per-title encoding approach may be used to construct BL 908. For each representation selected for BL 908, a content-aware DNN-based video enhancement may be trained to generate DNNs 910 to improve quality for GPU-available clients 916. Super-resolution may be used to enhance the quality of selected bitrate-resolution pairs. For each bitrate-resolution pair in BL 908, trained DNNs 910 may be added as an enhancement layer (EL) to the bitrate ladder as metadata. In some examples, trained DNNs 910 may comprise content-aware (i.e., content-adaptive) VSR DNNs. In some examples, trained DNNs 910 may be compressed, as described herein, to reduce bitrate overhead to stream video content using BL+EL 912. A resulting bitstream in two layers (e.g., BL+EL 912) may be provided to client devices, including BL 908 for CPU-only clients 914 (e.g., to support backward compatibility), and BL+EL 912 (e.g., including compressed content-aware DNNs for each bitrate resolution pair) for GPU-available clients 916.

Figure 10B:
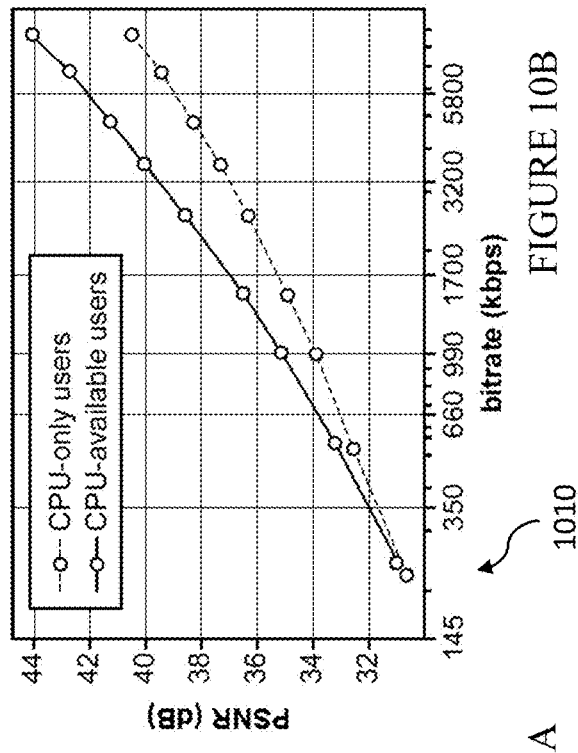
FIG. 10B is a chart showing rate distortion curves for selected bitrates for CPU users and GPU-available users after applying the trained VSR for GPU users, in accordance with one or more embodiments.
Figure 10A:
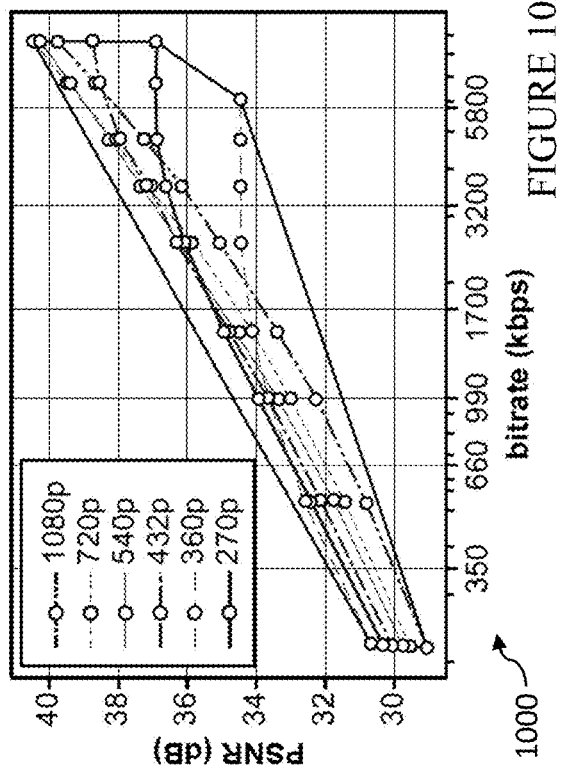
FIG. 10A is a chart showing rate distortion curves for an example sequence encoded at various resolutions and bitrates, including the formed convex-hull, in accordance with one or more embodiments.

FIG. 10A is a chart showing rate distortion curves for an example sequence encoded at various resolutions and bitrates, including the formed convex-hull, in accordance with one or more embodiments. Chart 1000 shows RD curves for an example sequence encoded at various resolutions (e.g., 270p, 360p, 432p, 540p, 720p, and 1080p) at a set of bitrates with a network trained for the selected representations. The formed convex-hull also is shown.

FIG. 10B is a chart showing rate distortion curves for selected bitrates for CPU users and GPU-available users after applying the trained, in accordance with one or more embodiments. Chart 1010 shows RD curves for selected bitrates for CPU users and GPU-available users, after applying the trained VSR for GPU users. As shown, GPU users receive videos at a higher quality than CPU users.

Figure 11:
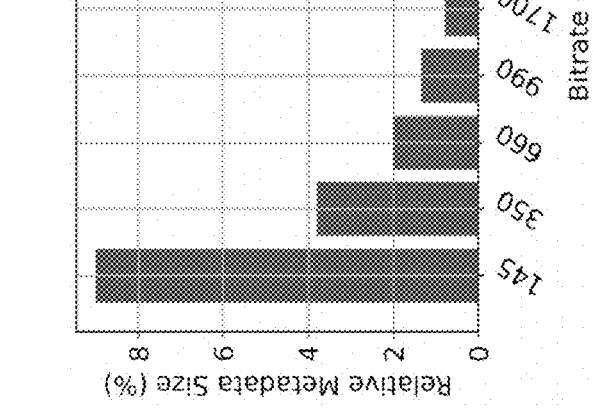
FIG. 11 is a chart that illustrate the relative size of compressed DNN (i.e., enhancement layer) to its corresponding bitstream (i.e., base layer), in accordance with one or more embodiments.

FIG. 11 is a chart that illustrate the relative size of compressed DNN(s) (e.g., an enhancement layer) to its corresponding bitstream (e.g., a base layer). As shown, in SPTE the ratio of enhancement layer (i.e., metadata) to its corresponding representation (i.e., base layer bitrate) is marginal. Also, as the base layer bitrate is increased, the percentage of increased bitrate is reduced, which is in contrast to standard scalable codecs. In an example, e1=100 epochs for a first segment of each scene and e2=10 for other segments in the same scene. The training times for different resolutions in an exemplary GPU (e.g., NVIDIA Quadro RTX 8000 GPU) are summarized in Table I.

TABLE I

| Training times. | | |
|---|---|---|
| Sequence | first segment | other segments |
| 270p | 44s | 5s |
| 360p | 53s | 6s |
| 432p | 62s | 7s |
| 540p | 86s | 9s |
| 720p | 103s | 11s |

Note that video sequences with lower numbers of scene-cuts require lower training times. Moreover, the more low-resolution representations selected for the bitrate ladder, the lower the training time is.

BD–PSNR and BD–VMAF values for GPU users compared to the CPU users are summarized in Table II. It is seen that GPU users receive the same video on average 9.91 VMAF (0.84 dB PSNR) higher than the CPU users.

TABLE II

| BD – PSNR and BD – VMAF values for test sequences | | |
|---|---|---|
| Sequence | BD – PSNR (dB) | BD – VMAF |
| Park | 1.02 | 12.99 |
| Lake | 0.88 | 14.58 |
| Basketball | 1.29 | 9.32 |
| Flowers | 0.51 | 7.27 |
| Construction | 0.09 | 0.98 |
| Maples | 1.37 | 14.24 |
| Dolls | 1.03 | 10.26 |
| Bunny | 0.46 | 7.12 |
| Crowd | 0.91 | 12.46 |
| Average | 0.84 | 9.91 |

Figure 12:
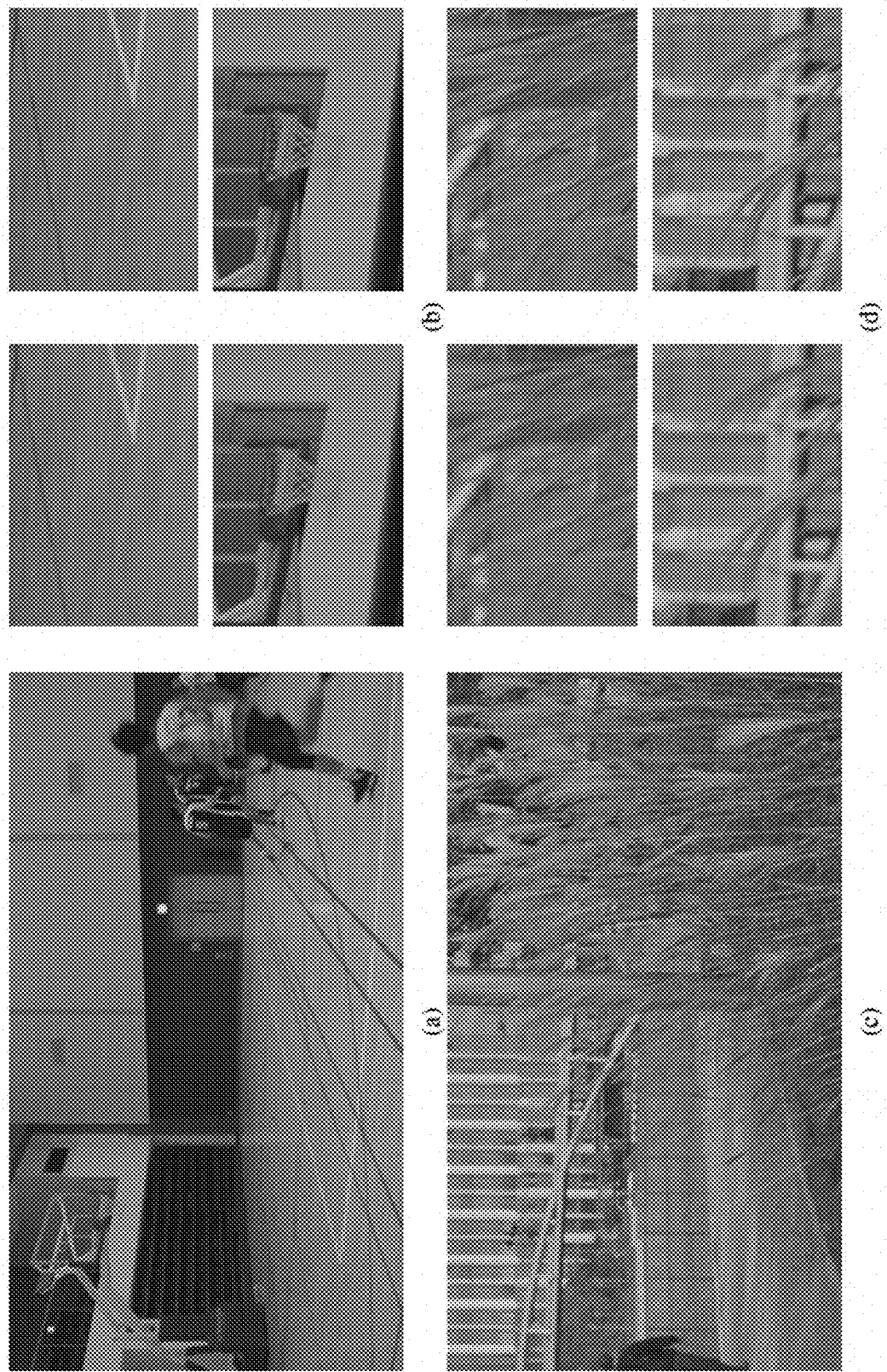
FIG. 12 is a series of images illustrating the qualitative comparisons between CPU and GPU users, in accordance with one or more embodiments.

FIG. 12 is a series of images illustrating the qualitative comparisons between CPU and GPU users, in accordance with one or more embodiments. In (a) a first frame of a sequence encoded at 540p and 660 kbps is shown. In (b) a set of cropped images for (left) CPU users and (right) GPU users are shown, the images for GPU users being of better quality. In (c) a first frame of another sequence encoded at 360p and 330 kbps is shown. In (d) a set of cropped images for (left) CPU users and (right) GPU users are shown, again with better quality images for GPU users.

Figure 13:
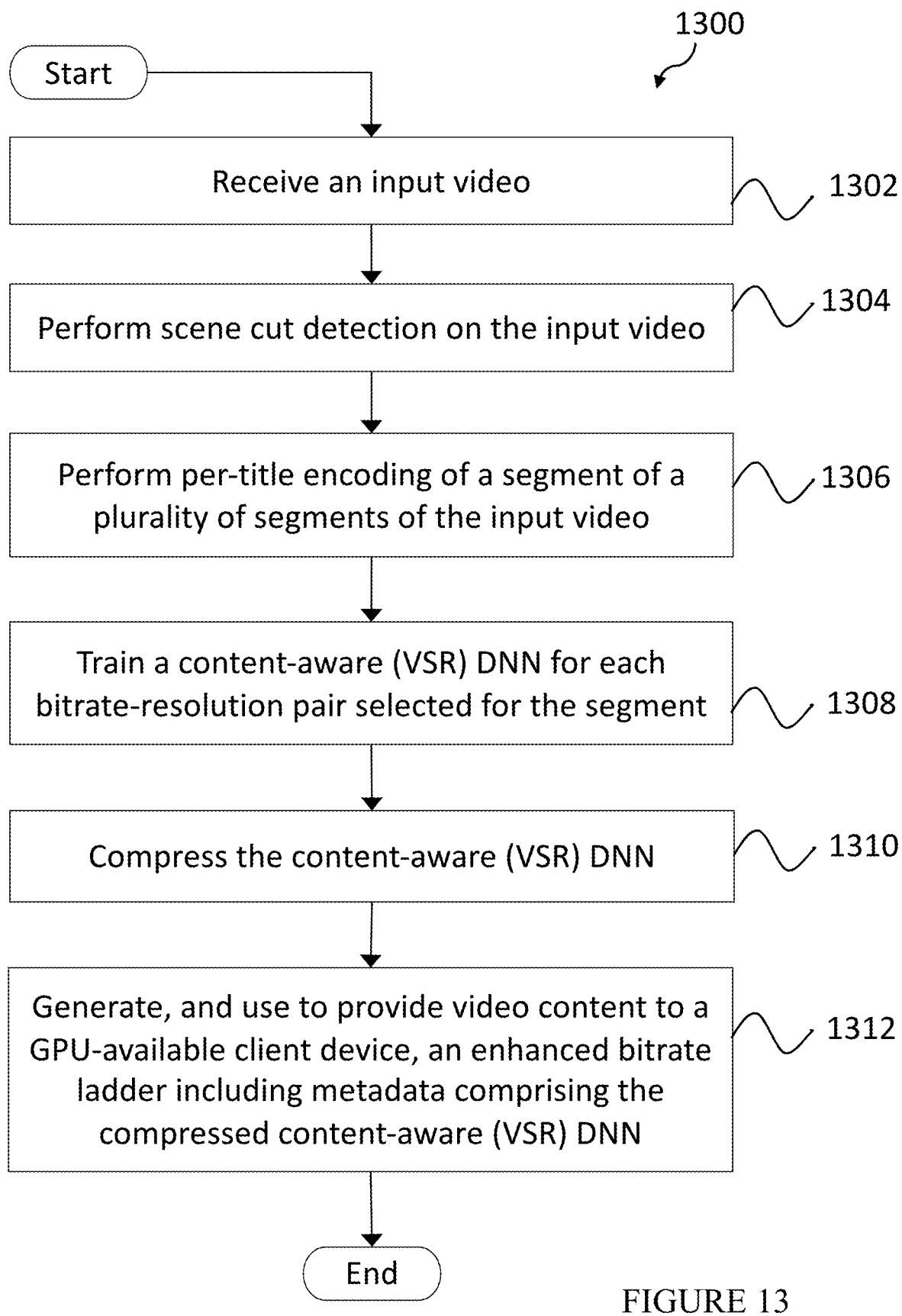
FIG. 13 is a flow diagram illustrating an exemplary method for scalable per-title encoding, in accordance with one or more embodiments.

FIG. 13 is a flow diagram illustrating an exemplary method for scalable per-title encoding, in accordance with one or more embodiments. Method 1300 begins with receiving an input video at step 1302. Scene cut detection may be performed on the input video at step 1304. In some examples, scene cut detection may include implementation of an efficient content-adaptive feature-based shot detection algorithm, as described herein. In some examples, the input video may be concatenated and then segmented (e.g., divided, partitioned), as described herein, thereby generating a plurality of segments. Per-title encoding of a segment of the plurality of segments may be performed in step 1306, which may result in construction of a bitrate ladder (e.g., a base layer configured for CPU client devices, as described herein). A content-aware (e.g., VSR) DNN may be trained for each bitrate-resolution pair selected for the segment in the bitrate ladder at step 1308. In some examples, a determination may be made of whether the segment comprises a first scene segment (i.e., a first segment of a scene). If the segment comprises a first scene segment, the content-aware DNN may be trained using a first number of epochs (e.g., e1); if the segment does not comprise a first scene segment, the content-aware VSR DNN may be trained using a second number of epochs (e.g., e2), wherein e2<e1. In some examples, the DNNs for following $(N+1)^{th}$ segments (i.e., not a first scene segment) may be trained using weights from a previous trained DNN for another $N^{th}$ segment from the same scene (e.g., a first scene segment and other segments having previously-trained DNNs). The content-aware (VSR) DNN may be compressed at step 1310. In some examples, the compressed content-aware (VSR) DNN may be stored as metadata associated with the base layer bitrate ladder, as described herein. A resulting enhanced bitrate ladder including the metadata (e.g., enhanced layer) may be generated and used to provide video content to a GPU-available client device in step 1312, the metadata comprising the compressed content-aware (VSR) DNN.

Figure 14:
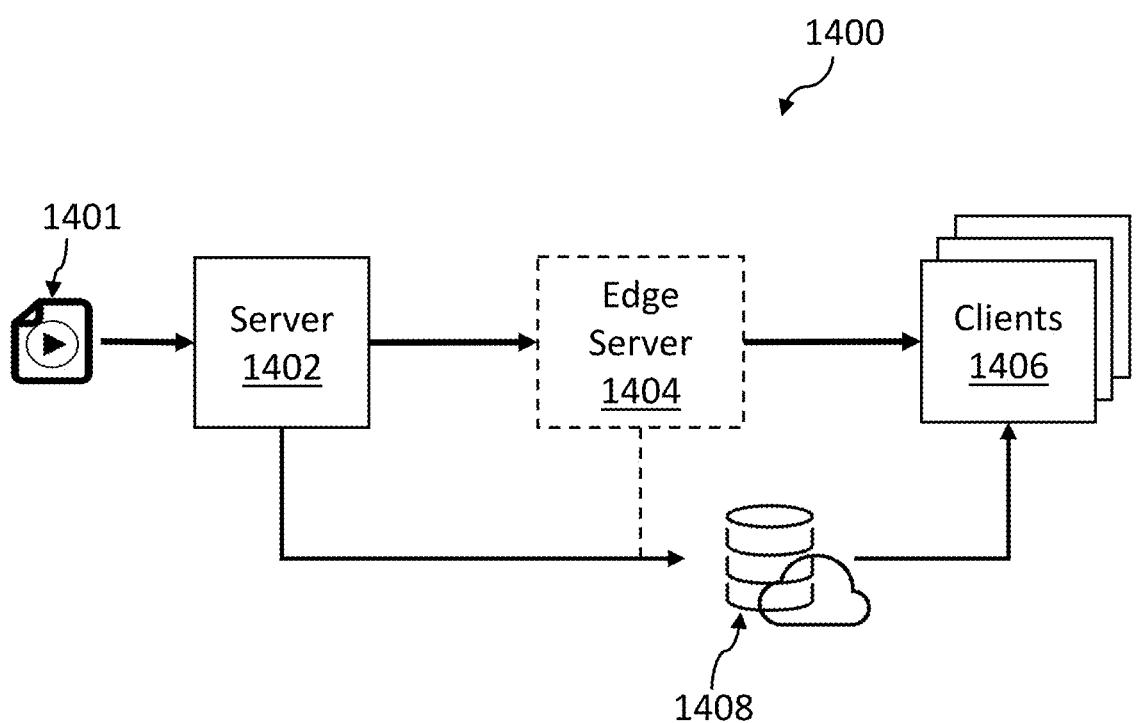
FIG. 14 is a simplified block diagram of an exemplary video streaming network, in accordance with one or more embodiments.

FIG. 14 is a simplified block diagram of an exemplary video streaming network, in accordance with one or more embodiments. Network 1400 includes a server 1402, an optional edge server 1404, clients 1406, and storage 1408. Network 1400 may comprise a content delivery network (CDN). Server 1402 may be configured to receive video data 1401 (e.g., a video content). Server 1402 may be configured to encode a bitrate ladder (e.g., comprising n representations) for video data 1401, and to generate encoding metadata for representations of video data 1401. In some examples, server 1402 also may be configured to compress the metadata as described herein. Server 1402 may be configured to provide one or more representations of the n representations, along with encoding metadata for the one or more representations, to clients 1406, either directly, through edge server 1404, and/or through storage 1408. In some examples, server 1402 also may be configured to generate and provide an enhanced bitrate ladder with metadata (e.g., comprising a compressed content-aware VSR DNN) to a GPU user among clients 1406.

In some examples, storage 1408 may be implemented as a distributed element of network 1400, as shown, and in other examples, storage 1408 may be implemented as part of a server (e.g., server 1402 and/or edge server 1404). Edge server 1404 may be configured to transcode one or more representations of video data 1401. In some examples, edge server 1304 may receive a client request from one or more of clients 1406.

Each of server 1402 and edge server 1404 may include a memory configured to store video data, encoded data, metadata, networks, and other data and instructions (e.g., in a database, an application, data store, etc.) for performing any of the features and steps described herein. A memory may include any non-transitory computer-readable storage medium for storing data and/or software that is executable by a processor, and/or any other medium which may be used to store information that may be accessed by a processor to control the operation of a computing device (e.g., server 1402, edge server 1404, clients 1406). Each of server 1402 and edge server 1404 also may comprise a processor configured to execute instructions stored in a memory to carry out steps described herein. In other examples, server 1402 and edge server 1404 may comprise, or be configured to access, data and instructions stored in other storage devices (e.g., storage 1408). In some examples, one or more of server 1402 and edge server 1404 may comprise an encoding and/or transcoding system, including hardware and software to implement a decoding module and an encoding module, the decoding module configured to decode an input video from a format into a set of video data frames, the encoding module configured to encode video data frames into a video based on a video format or otherwise encode a video input or segment as described herein. The encoding and/or transcoding system also may analyze an output video to extract encoding statistics, determine optimized encoding parameters for encoding a set of video data frames into an output video based on extracted encoding statistics, decode intermediate video into another set of video data frames, and encode the other set of video data frames into an output video based on the desired format and optimized encoding parameters. In some examples, the encoding and/or transcoding system may be a cloud-based system available via computer networks, such as the Internet, a virtual private network, or the like, with any of its components being hosted by a third party or kept within the premises of an encoding enterprise, such as a publisher, video streaming service, or the like. The encoding and/or transcoding system may be a distributed system or it may be implemented in a single server system, multi-core server system, virtual server system, multi-blade system, data center, or the like.

In some examples, outputs (e.g., representations, metadata, networks (e.g., DNNs, compressed or not compressed), other video content data) from server 1402 and edge server 1404 may be stored in storage 1408. Storage 1408 may make content (e.g., said outputs) available via a network, such as the Internet. Delivery may include publication or release for streaming or download. In some examples, multiple unicast connections may be used to stream video (e.g., real-time) to a plurality of clients (e.g., clients 1406, also clients 914 and 916 in FIG. 9).

While specific examples have been provided above, it is understood that the present invention can be applied with a wide variety of inputs, thresholds, ranges, and other factors, depending on the application. For example, the time frames and ranges provided above are illustrative, but one of ordinary skill in the art would understand that these time frames and ranges may be varied or even be dynamic and variable, depending on the implementation.

As those skilled in the art will understand, a number of variations may be made in the disclosed embodiments, all without departing from the scope of the invention, which is defined solely by the appended claims. It should be noted that although the features and elements are described in particular combinations, each feature or element can be used alone without other features and elements or in various combinations with or without other features and elements. The methods or flow charts provided may be implemented in a computer program, software, or firmware tangibly embodied in a computer-readable storage medium for execution by a general-purpose computer or processor.

Examples of computer-readable storage mediums include a read only memory (ROM), random-access memory (RAM), a register, cache memory, semiconductor memory devices, magnetic media such as internal hard disks and removable disks, magneto-optical media, and optical media such as CD-ROM disks.

Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, or any combination of thereof.

What is claimed is:

1. A method for scalable per-title encoding, the method comprising:
   receiving an input video;
   detecting scene cuts in the input video;
   generating a plurality of segments of the input video;
   performing per-title encoding of a segment of the plurality of segments of the input video;
   training a deep neural network (DNN) for each representation of the segment, resulting in a trained DNN, the training the DNN including a first number of epochs when the segment comprises a first scene segment and a second number of epochs when the segment does not comprise the first scene segment, wherein the second number of epochs is less than the first number of epochs;
   compressing the trained DNN, resulting in a compressed trained DNN; and
   generating an enhanced bitrate ladder including metadata comprising the compressed trained DNN; and
      providing video content to a GPU-available client device using the enhanced bitrate ladder,
      the second number of epochs uses a weight from a previously-trained DNN for the first scene segment from the same scene.

2. The method of claim 1, wherein the generating the plurality of segments of the input video includes indicating a first scene segment.

3. The method of claim 1, further comprising determining whether the segment comprises the first scene segment.

4. The method of claim 1, wherein generating the plurality of segments comprises concatenating a plurality of scenes, resulting in a concatenated video.

5. The method of claim 4, wherein generating the plurality of segments further comprises dividing the concatenated video into the plurality of segments.

6. The method of claim 1, wherein detecting scene cuts comprises implementing an efficient content-adaptive feature-based shot detection algorithm.

7. The method of claim 1, wherein the DNN comprises a content-aware video super-resolution (VSR) DNN.

8. The method of claim 7, further comprising providing the base layer bitrate ladder to a CPU device.

9. The method of claim 1, further comprising generating a base layer bitrate ladder for the plurality of segments.

10. A non-transitory computer-readable medium storing computer instructions for scalable per-title encoding that when executed on one or more computer processors perform the steps of:
   receiving an input video;
   detecting scene cuts in the input video;
   generating a plurality of segments of the input video;
   performing per-title encoding of a segment of the plurality of segments of the input video;
   training a deep neural network (DNN) for each representation of the segment, resulting in a trained DNN, the training the DNN including a first number of epochs when the segment comprises a first scene segment and a second number of epochs when the segment does not comprise the first scene segment, wherein the second number of epochs is less than the first number of epochs;
   compressing the trained DNN, resulting in a compressed trained DNN; and
   generating an enhanced bitrate ladder including metadata comprising the compressed trained DNN; and
   providing video content to a GPU-available client device using the enhanced bitrate ladder,
   wherein the second number of epochs uses a weight from a previously-trained DNN for the first scene segment from the same scene.

11. The non-transitory computer-readable medium of claim 10, wherein the computer instructions for scalable per-title encoding when executed further perform the step of:
   determining whether the segment comprises a first scene segment.

12. The non-transitory computer-readable medium of claim 10, wherein the computer instructions for scalable per-title encoding when executed further perform the step of: generating a base layer bitrate ladder for the plurality of segments.

13. The non-transitory computer-readable medium of claim 10, wherein the computer instructions for scalable per-title encoding when executed further perform the step of: storing in a network-accessible storage one, or a combination of, the enhanced bitrate ladder, the plurality of segments, the trained DNN, the compressed trained DNN.

* * * * *